United States Patent [19]

Meier et al.

[11] Patent Number: 5,975,103
[45] Date of Patent: Nov. 2, 1999

[54] METHOD OF PRODUCING FLAT SLIDE VALVES

[75] Inventors: Gerd Meier, Leinburg; Peter Stingl; Klaus Russner, both of Lauf, all of Germany

[73] Assignee: Ceramtec AG Innovative Ceramic Engineering, Selb, Germany

[21] Appl. No.: 08/617,404

[22] Filed: Mar. 19, 1996

[30] Foreign Application Priority Data

Mar. 21, 1995 [DE] Germany .................... 195 10 205

[51] Int. Cl.⁶ ................................................ F16K 11/074
[52] U.S. Cl. .................. 137/15; 137/625.17; 137/625.4
[58] Field of Search ............... 137/625.17, 625.4, 137/15

[56] References Cited

U.S. PATENT DOCUMENTS

| | | | |
|---|---|---|---|
| 2,020,286 | 11/1935 | Bittle | 137/625.4 X |
| 4,258,751 | 3/1981 | Humpert et al. | 137/625.4 |
| 4,672,999 | 6/1987 | Knapp | 137/625.17 X |
| 4,935,313 | 6/1990 | Knapp et al. | 137/625.17 X |
| 4,957,135 | 9/1990 | Knapp | 137/625.17 X |
| 4,962,912 | 10/1990 | Stoll | 251/208 |
| 5,111,842 | 5/1992 | Knapp | 137/625.17 X |
| 5,372,161 | 12/1994 | Bechte | 137/625.17 |

FOREIGN PATENT DOCUMENTS

| | | |
|---|---|---|
| 0 063 660 | 11/1982 | European Pat. Off. . |
| 0 416 294 | 3/1991 | European Pat. Off. . |
| 0 616 156 | 2/1994 | European Pat. Off. . |
| 35 33 657 | 4/1987 | Germany . |
| 7811932 | 6/1979 | Netherlands . |

*Primary Examiner*—John Rivell
*Attorney, Agent, or Firm*—Foley & Lardner

[57] ABSTRACT

The invention relates to a method of producing a flat slide valve with incorporation of at least one inlet disk in a housing or in at least one element of a housing, wherein the inlet disk is joined to the housing or to at least one element of the housing by forcelocking, formlocking and/or bonding. The invention further provides a flat slide valve having at least one sealing disk, in which at least one of the sealing disks is incorporated into an element of the flat slide valve.

12 Claims, No Drawings

METHOD OF PRODUCING FLAT SLIDE VALVES

The invention relates to a method of producing a flat slide valve with incorporation of at least one inlet or/and at least one regulating disk into a housing, into elements of a housing, into connection elements or directly into the control lever. Flat slide valves or taps containing flat slide valves are used particularly in the sanitary and household field, in the chemical and process industry and in the beverages industry.

Sanitary taps having ceramic inlet or/and regulating disks are known to those skilled in the art in the sanitary area from everyday practice. The advantage of sanitary taps having ceramic inlet or/and regulating disks compared with other sealing systems are that these taps can usually be operated for many years without maintenance, reliably and without malfunction. Furthermore, there are considerable advantages in comfort, since in the case of flat slide valves having ceramic disks the switching paths and forces which have to be applied to influence the liquid streams, for example in single-lever or multilever mixing taps, are considerably lower than in the earlier generation of taps having a cylindrical sealing arrangement, which owing to the construction relied on movable rubber seals which were more prone to wear and aging.

A sealing disk is an element of a flat slide valve. The term sealing disk is used as an overall term for inlet, base, control, regulating and directing disks; owing to the large number of subordinate terms, only the terms inlet and regulating disks will be used here. An inlet disk takes up the incoming liquid streams, while a regulating disk closes, partly opens or completely opens the associated liquid channels in combination with the inlet disk. The individual liquid stream or the mixed liquid stream coming from a plurality of liquid channels is finally conducted through the inlet disk via at least one other channel. There are many sealing disk geometries which are used as mass produced items and differ in size, shape and configuration, particularly in terms of their diameter and their holes and pockets.

Up to now, all taps having flat slide valves have in common that they are, according to the prior art, built up individually from the individual components sealing disks, sealing rings, control lever and housing or elements of the housing. This is done, for example, by clipping (elastic locking in place) or welding. A disadvantage is that all these individual components have to be aligned with one another and placed together. In addition, sealing problems in the housing occur evermore frequently, since when the pressure in the water distribution networks is increased, as often occurs, the seals can lift from the sealing disks or/and the housing in the tap, so that the tap leaks.

The functional principle of a flat slide valve provides for the inlet disk to be arranged in the housing so that it cannot turn and at least one regulating disk to be arranged in a movable fashion above the inlet disk. The regulating disk is joined either directly to the control lever or via a connecting element to the control lever. Seals whose function it is to prevent leakage are present between housing and inlet disk and between regulating disk and housing.

A flat slide valve for the control of liquid streams generally comprises a housing or a plurality of housing elements, two or three sealing disks, components for sealing such as sealing rings or sealing profiles, sound dampers and the control lever or the control lever elements and possibly sieve inserts. The various individual parts are pressed together and fixed together in a housing with the sealing disks while maintaining exactly defined pressures. The sealing disks usually comprise a wear- and corrosion-resistant material such as an aluminum oxide-rich or silicon carbide-rich ceramic material.

It is an object of the present invention to propose a simpler method of producing a flat slide valve and an inexpensive flat slide valve in which the frequently observed sealing problems do not occur.

This object is achieved according to the present invention by a method of producing a flat slide valve with incorporation of at least one inlet disk in a housing or in at least one element of a housing, which comprises joining the inlet disk to the housing or to at least one element of the housing by forcelocking, formlocking and/or bonding, especially retention by self substance. Furthermore, this object is achieved according to the present invention by a method of producing a flat slide valve using at least one regulating disk, which comprises joining the regulating disk via a connecting element to a control lever or directly to a control lever by forcelocking, formlocking and/or bonding, especially retention by self substance.

Furthermore, this object is achieved according to the present invention 1. by a flat slide valve having at least one sealing disk, wherein at least one of the sealing disks is incorporated into an element of the plane slide valve, 2. by a flat slide valve having at least one sealing disk, wherein at least one sealing disk is not fixed by plastics injection molding or adhesive bonding into another element of the flat slide valve which has at least one functional surface and is encased in plastic outside the functional surfaces or 3. by a flat slide valve having at least one sealing disk, wherein at least one of the sealing disks is adhesively bonded into a housing, a housing element or a connecting element or is adhesively bonded directly to the control lever.

In the flat slide valve of the present invention, the inlet disk is, contrary to the prior art, not incorporated directly via a seal and a twisting lock, but let into, adhesively bonded into or otherwise incorporated into the bottom of the housing by forcelocking, formlocking and/or retention by self substance. This can be done, for example, by means of plastics injection molding or adhesive bonding. When the inlet disk is adhesively bonded in, a pin-shaped or tab-shaped projection of the bottom plate or the bottom of the housing or the housing element can project into at least one recess in the inlet disk so as to additionally secure the adhesive bond. In a further embodiment of the invention, the regulating disk is fixed into the connecting element to the control lever or directly into the control lever, which is likewise preferably done by means of plastics injection molding or adhesive bonding. In both cases, this method of construction prevents leakage from occurring because of a seal which is seated incorrectly, lifted off or worn; in addition, assembly is made considerably easier and production and repair costs are reduced. In each of these joining methods according to the present invention, in contrast to a corresponding construction according to the prior art, a sealing ring or a sealing lip between the sealing disk and the housing, housing element or connection element associated therewith or to the control lever is usually unnecessary. The total thickness of the valve is also reduced thereby.

The sealing disks of the flat slide valves of the present invention preferably comprise a ceramic such as aluminum oxide-containing or silicon carbide-containing ceramic or a composite material or preferably contain composite components such as parts of ceramic/metal, ceramic/plastic or metal/plastic.

The sealing disks can be partially encased in a plastic, with this surrounding plastic at the same time also being able to take over other functions such as that of a housing or housing element or of a connecting element or control lever. Sealing disks having stepped or chamfered side sections can, for example, be accommodated in a dovetail-like manner in the plastic part and be anchored by forcelocking, formlocking and/or bonding. The stepping or chamfering of the sealing disk can be fixed into the plastic in such a way that the plastic does not project perpendicularly to the functional surface of the sealing disk, so as not to structurally restrict the freedom of movement of the movable sealing disk. Recesses in the sealing disk can also serve as twisting lock here. The plastic part can be advantageously produced by injection molding, by positioning the sealing disk to be molded in in the injection molding tool prior to injection molding and injecting the plastic around it. Plastics used can be the known injection molding materials. The methods of plastics injection molding and adhesive bonding have long been known to those skilled in the art and require no further explanation.

The flat slide valves of the present invention can be used for the control of liquid streams in the household and sanitary fields and also, for example, in the chemical and process industries, or the beverages industry. For every application, the plastics injection molding or adhesive bonding can be adapted to the product design in a manner with which those skilled in the art are familiar.

We claim:

1. A method of producing a flat slide valve with incorporation of at least one inlet disk in a housing or in at least one element of a housing, which comprises joining the inlet disk to the housing or to at least one element of the housing by plastics injection molding, wherein the installation of the at least one inlet disk is performed without the aid of a seal between the disk and the housing or housing element and the connecting means or control lever.

2. The method of producing a flat side valve as claimed in claim 1, wherein the inlet disk is joined to the housing element and not the housing, and wherein the housing element is a bottom plate.

3. The method of producing a flat slide valve as claimed in claim 1, wherein the inlet disk is produced from a ceramic or a composite material.

4. The method of producing a flat slide valve as claimed in claim 1, wherein the inlet disk is produced as a composite component of ceramic and metal parts, of ceramic and plastic parts or of metal and plastic parts.

5. The method of producing a flat slide valve as claimed in claim 1, wherein the flat slide valve additionally incorporates at least one sealing disk which is not fixed by plastics injection molding or adhesive bonding into another element of the flat slide valve which has at least one functional surface and has been encased in plastic outside the functional surface.

6. The method of producing a flat slide valve as claimed in claim 1, wherein the inlet disk is produced from an aluminum oxide-containing or silicon carbide-containing material.

7. A method of producing a flat slide valve using at least one regulating disk, which comprises joining the regulating disk via a connecting element to a control lever or directly to a control lever by plastics injection molding, wherein the installation of the at least one regulating disk is performed without the aid of a seal between the disk and a housing or a housing element and the connecting means or control lever.

8. The method of producing a flat slide valve as claimed in claim 7, wherein the regulating disk is produced from a ceramic or a composite material.

9. The method of producing a flat slide valve as claimed in claim 7, wherein the regulating disk is produced as a composite component of ceramic and metal parts, of ceramic and plastic parts or of metal and plastic parts.

10. The method of producing a flat slide valve as claimed in claim 7, wherein the flat slide valve additionally incorporates at least one sealing disk which is not fixed by plastics injection molding or adhesive bonding into another element of the flat slide valve which has at least one functional surface and has been encased in plastic outside the functional surface.

11. The method of producing a flat slide valve as claimed in claim 7, wherein the regulating disk is produced from an aluminum oxide-containing or silicon carbide-containing material.

12. The method of producing a flat slide valve as claimed in claim 8, wherein the regulating disk is produced from an aluminum oxide-containing or silicon carbide-containing material.

* * * * *

UNITED STATES PATENT AND TRADEMARK OFFICE
CERTIFICATE OF CORRECTION

PATENT NO. : 5,975,103
DATED : November 2, 1999
INVENTOR(S) : MEIER *et al.*

It is certified that error appears in the above-indentified patent and that said Letters Patent is hereby corrected as shown below:

On the title page, at Item [75] Inventors, please insert after "Klaus Russner;" --Wolfgang Seitz, Leingarten; Ulrich Wellhäuser; Sinsheim; both of Germany.--

Signed and Sealed this

Nineteenth Day of September, 2000

Attest:

Q. TODD DICKINSON

*Attesting Officer*  *Director of Patents and Trademarks*